US006862431B2

(12) United States Patent
Richter

(10) Patent No.: US 6,862,431 B2
(45) Date of Patent: Mar. 1, 2005

(54) MOBILE RADIO SET OF A CELLULAR NETWORK FOR THE TRANSMISSION OF SPEECH AND/OR DATA, AND A METHOD THEREFOR

(75) Inventor: Thomas Richter, Lauf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 722 days.

(21) Appl. No.: 09/728,112

(22) Filed: Dec. 1, 2000

(65) Prior Publication Data

US 2002/0155815 A1 Oct. 24, 2002

(30) Foreign Application Priority Data

Dec. 4, 1999 (DE) ......................................... 199 58 556

(51) Int. Cl.[7] .............................................. H04B 17/00
(52) U.S. Cl. ................. 455/67.11; 455/450; 455/452.2; 455/513; 455/509; 455/434; 455/433; 455/517; 455/524
(58) Field of Search ................................ 455/67.1, 450, 455/452.2, 425, 433, 455, 436, 434, 513, 514, 515, 516, 525, 67.11

(56) References Cited

U.S. PATENT DOCUMENTS

| | | | | |
|---|---|---|---|---|
| 5,327,577 A | * | 7/1994 | Uddenfeldt | ................. 455/442 |
| 5,640,675 A | | 6/1997 | Pinault et al. | ............. 455/33.1 |
| 5,726,978 A | * | 3/1998 | Frodigh et al. | ............. 370/252 |
| 5,828,963 A | * | 10/1998 | Grandhi et al. | ............. 455/450 |
| 5,909,471 A | * | 6/1999 | Yun | ............................ 375/343 |
| 5,956,642 A | * | 9/1999 | Larsson et al. | ............. 455/449 |
| 6,021,123 A | * | 2/2000 | Mimura | ...................... 370/331 |
| 6,041,238 A | * | 3/2000 | Tanoue | .................... 455/452.2 |
| 6,131,038 A | * | 10/2000 | Sekine | ....................... 455/513 |
| 6,259,917 B1 | * | 7/2001 | Elzein | ..................... 455/435.2 |
| 6,343,070 B1 | * | 1/2002 | Klas et al. | ................... 370/329 |

* cited by examiner

Primary Examiner—Marceau Milord

(57) ABSTRACT

The invention relates to a mobile radio set (M) for a cellular network. In order to enable a more reliable determination as to whether a mobile radio set has been moved between switching off and subsequent switching on, the following elements are provided: a first storage section (S1) for storing all relevant channels, acquisition means (E1) for measuring, for the channels stored in the first storage means (S1) prior to the switching off and after the switching on of the mobile radio set (M), a variable which is dependent on the distance between the mobile radio set (M) and the base stations that make a channel available, a second storage section (S2) for storing the variables measured before the switching off, and evaluation means (A) for determining a value characterizing the deviation between the variables stored in the second storage section (S2) and the variables measured after the switching on. Comparison of this value with a predetermined value then enables the decision that movement has taken place. The invention also relates to a method of determining a movement of a mobile radio set.

17 Claims, 1 Drawing Sheet

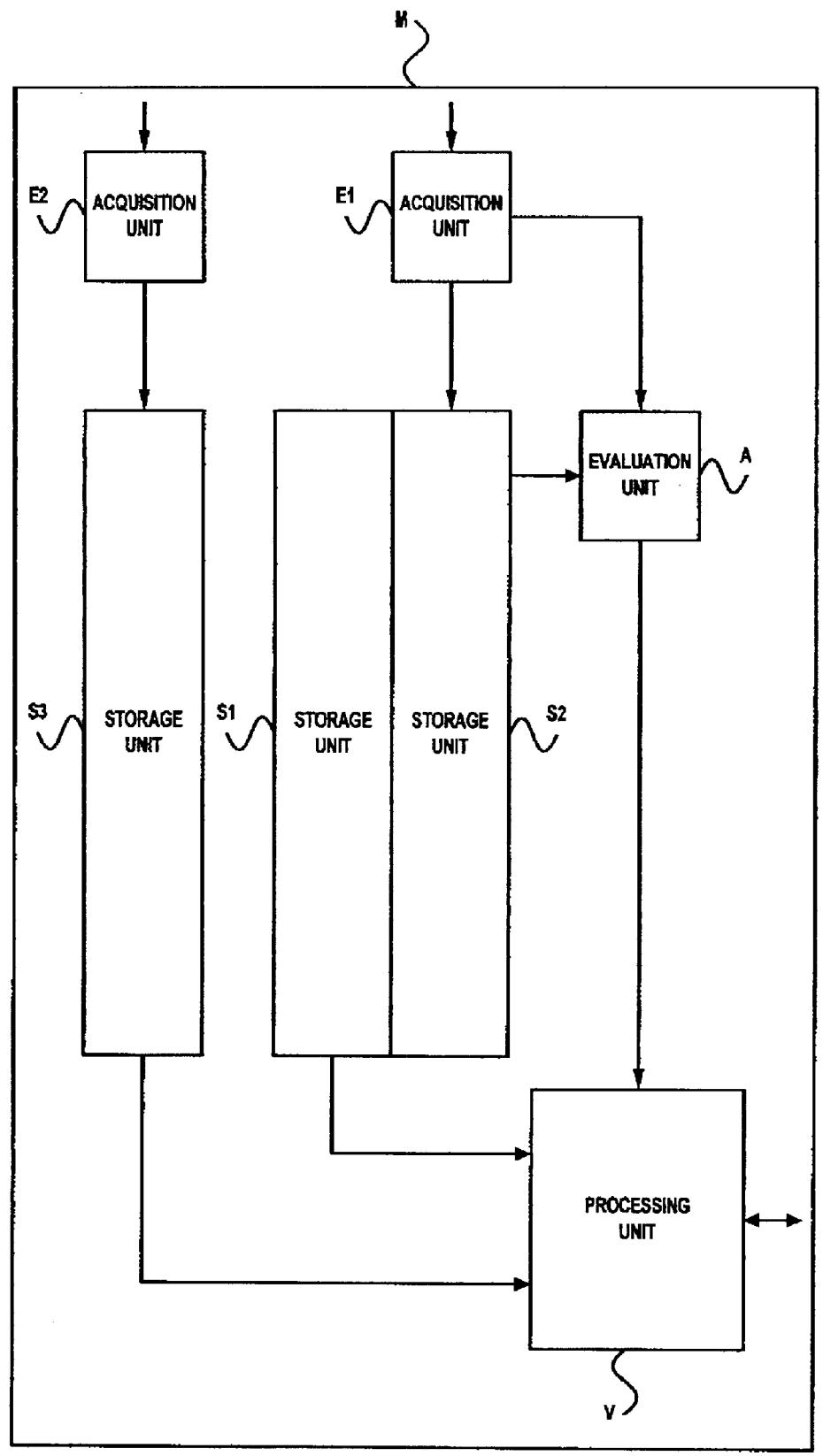
Fig.

MOBILE RADIO SET OF A CELLULAR NETWORK FOR THE TRANSMISSION OF SPEECH AND/OR DATA, AND A METHOD THEREFOR

The invention relates to a mobile radio set for a cellular network for the transmission of speech and/or data, and to a method for determining whether such a mobile radio set has been physically moved between a switch off and a subsequent switch on.

Mobile radio sets for analog or digital cellular networks for the transmission of speech and/or data, that are available to a mobile radio subscriber in order to establish a telephone link, a data link or other link via a radio interface independently of the instantaneous location are known in practice. For such mobile radio sets it may be very important to know whether the mobile radio set has been physically moved in a period of time between the switching off of the mobile radio set and the subsequent switching on.

Cellular networks, such as DCS1800 (Digital Communication System at 1800 MHz), GSM (Global System of Mobile Communication), PCS 1900 (Personal Communication System at 1900 MHz) used in the USA or DAMPS (Digital Advanced Mobile Phone System) have a number of fixed base stations that serve the mobile radio sets, by allocating radio resources to the mobile radio subscribers. Each of the base stations covers a given region in which a mobile radio set can avail itself of a service via the relevant base station.

Because they can be displaced by their users between a switch off and a switch on, upon each switch on the mobile radio sets must determine a base station via which the requested connections can be established.

The base stations where between the mobile radio set can select in a given location comprise different channels because of the use of different parameters, for example, due to the use of different control frequencies, each network having only a limited number of feasible channels available. The channels may be determined, for example, by the specification of a frequency band within which various channels can be used with a given bandwidth. Moreover, usually various service providers usually share the total number of allocated channels in a network.

When a mobile radio set does not know the location in which it is present upon switch on, for all relevant channels it will first acquire a variable which is a measure of the distance between the mobile radio set and the base station making the channel available. The acquired variable usually consists of the receiving level. Subsequently, for a channel having a "suitable" variable, that is, usually an adequately high receiving level, the mobile radio set will subsequently check whether this channel is available for the desired service. Moreover, in the presence of several providers in the network the mobile radio subscriber will wish to select a given provider, for example, because the costs of a service as charged by the various providers differs. Such a selection of a channel is a time-consuming and energy-consuming process, because usually it is first necessary to realize synchronization with the relevant base station and transmitted information must be read. Moreover, it may be that synchronization signals and other signals are transmitted only with large time intervals. In some cases even a bidirectional data exchange between the base station and the mobile radio set is required before the mobile radio subscriber can avail himself of a desired service, notably because some providers do not offer their services to all mobile radio subscribers.

The mobile radio subscriber, however, wishes to have a service available as quickly as possible after having switched on the mobile radio set. If it is necessary to search each time all relevant channels in order to find the best channel, such a service cannot be quickly provided.

In order to accelerate the channel searching process at least for the case where the mobile radio set has not been moved between switch off and subsequent switch on, it is customary to store a list of channels that can presumably be used at the instantaneous location and should be searched first upon switch on. This list either is made available by the base stations or is stored in the mobile radio set. It is used when a check of the relevant receiving levels after switch on reveals that channels with a suitable receiving level are contained in the list. This list is updated each time before the mobile radio is switched off and can significantly reduce the time required to make a service available when the mobile radio set is present in substantially the same location as before switch off.

For the case where the mobile radio set has been physically moved between switch off and switch on, however, this procedure has a significant drawback.

When the mobile radio subscriber and the mobile radio set have moved to a different location, possibly even to a different country, some of the channels in the list stored will, normally speaking, have a suitable receiving level but be used by a different provider. However, this fact will be recognized by the mobile radio set only after having carried out a time and energy consuming check as to whether a connection is possible via such a channel. Only after that the search is extended to other channels in order to find a channel that is used by the desired provider in this location.

The overall search process always requires more time than necessary when the stored list has first been unsuccessively searched in the order of the associated receiving levels and subsequently all channels have to be searched in the order of the associated receiving levels.

Even when initially it is checked only whether the receiving levels of the stored channels are adequate for a connection, in the case where no usable channel is found more time will be required than when beforehand all channels were searched to start with. Finally, subsequent to the checking of the stored list all channels, or at least the remainder of the channels, must be measured and investigated for usability.

Energy-consuming and time-consuming methods, however, should be avoided in order to realize fast establishment of connections and also to achieve an as high as possible standby time for the mobile radio set.

The document U.S. Pat. No. 5,640,675, therefore, proposes to store a first list of control frequencies which are dispatched by the base stations in the region in which the mobile radio set is present at the relevant instant. Each base station is allocated control frequencies at which it transmits synchronization signals and other signals and via which the mobile radio sets must be synchronized with this base station. For the first list the receiving level is measured for each frequency for each establishment of a connection. Furthermore, a second list with control frequencies and the associated receiving levels must be stored, the control frequencies with the highest receiving levels being selected for this purpose. When a connection is established, all receiving levels of the second list are compared with the receiving levels, measured during the establishment of the connection, of the corresponding frequencies of the first list. When the receiving level in the first and in the second list is essentially the same for each frequency of the second list, the control frequency with the highest receiving level of the first list is selected for the connection; otherwise, synchronization takes place with all frequencies of the network in the order of decreasing receiving levels until a control frequency of the desired sub-network has been found. When the receiving levels of only one frequency in the first and the second list deviate substantially from one another, according to the method disclosed in U.S. Pat. No. 5,640,675 it must already be assumed that the mobile radio set has been moved, because only a very limited number of frequencies is available for the comparison. However, it may occur that the control frequency of a base station is changed, so that rejection takes place even though the mobile radio set has not been moved. Thus, the frequencies in the entire frequency spectrum of the network will be searched time and again, even though motion of the mobile radio set has only been falsely assumed.

It is an object of the invention to provide a mobile radio set for a cellular network for the transmission of speech and/or data and a method therefor which enable improved determination as to whether a mobile radio apparatus has been physically moved between a switch off and a subsequent switch on.

This object is achieved by a method of operating a mobile radio set involving (1) a measurement and storage of a variable (e.g., a receiving level) when the mobile radio set is switched off that characterizes a distance between the mobile radio set and a base station that makes a channel available for all channels allocated to the network, or for all channels that qualify for use for establishing a connection between the mobile radio set and a base station of the network, (2) a measurement of the variable when the mobile radio set is switched on for all channels allocated to the network, or for all channels that qualify for use for establishing a connection between the mobile radio set and a base station of the network, (3) a comparison of the variable as measured and stored when the mobile radio set is switched off and as measured when the mobile radio set is switched on to thereby derive a deviation value, and (4) a comparison of the deviation value to a predetermined value to thereby decide whether the mobile radio set was has or has not been moved between a switch off and a switch on of the mobile radio set.

The invention utilizes the fact that the detection of given variables of channels in a network, such as the receiving level, requires a comparatively small amount of energy and time. When such a variable is compared for all channels available in the network before switch off and after switch on of a mobile radio set, the mobile radio set has quasi available a "fingerprint" which enables a reliable verification, even in the case of a change of the variable of individual channels that is independent of the movement, as to whether a mobile radio set still is in approximately the same location after switch on as before switch off. The mobile radio set according to the invention and the method according to the invention thus enable enhanced detection of movement of a mobile radio set between switching off and switching on.

The main application is to be found in the context of channel search by mobile radio sets, that is, for making the decision whether a list of channels preferably used for the instantaneous environment prior to switch off should be used for the channel search or not, so that time and energy can be saved.

The mobile radio set according to the invention and the method according to the invention will be described in detail hereinafter on the basis of an embodiment and with reference to a drawing. The sole FIGURE shows diagrammatically the elements of a mobile radio set that are of essential importance to the invention.

The FIGURE shows the following elements of an embodiment of a mobile radio set M for a telecommunication network: three storage units S1, S2, S3, two acquisition units E1, E2, evaluation unit A, and a processing unit V.

A list containing all frequencies of the telecommunication network is stored in the first storage unit S1 of the mobile radio set M. For GSM in the 900 band, for example, it contains 124 different frequencies while for GSM in the 800 band it contains 372 different frequencies.

The receiving levels measured for the frequencies stored in the first storage unit S1 can be stored in the second storage unit S2.

Those frequencies from among the total number of available frequencies that are used as control frequencies in the geographic region in which the mobile radio set is present at the time are stored in the third storage unit S3, that is, from among these control frequencies there are stored only those frequencies that exhibit the highest receiving level, for example, the control frequencies with the six highest receiving levels. As has already been mentioned for the state of the art, the control frequencies are those frequencies that are used to transmit information signals and synchronization signals by the base stations.

The second storage unit S2 is connected to the first acquisition means unit E1 and the third storage unit S3 is connected to the second acquisition unit E2.

The storage unit S1, S2, S3 may form part of a common storage medium, and the acquisition units E1, E2 may be realized as a single unit which is connected to the antenna (not shown) of the mobile radio set 1.

An output of the first acquisition unit E1 and an output of the second storage unit S2 are connected to inputs of the evaluation unit A.

The output of the evaluation unit A itself has controlling access to a processing unit V. Further inputs of the processing unit V are connected to outputs of the first and the third storage units S1, S3. Finally, the processing unit V has a facility for a bidirectional data exchange with base stations (not shown) of the network via an antenna of the mobile radio set.

The mobile radio set M of the embodiment shown in the FIGURE operates as follows in conformity with the method according to the invention.

When the mobile radio set M is switched off, for each of the frequencies present in the first storage unit the acquisition me unit E1 determine the receiving level which is stored in the storage unit S2 in association with the frequencies. Furthermore, the control frequencies with the best reception in the relevant location are stored in the third storage unit S3, that is, either at regular intervals or upon switch off. The information as to which control frequencies are available for the desired service provider or are available at all in the instantaneous geographic region can either be transmitted by the base stations of the network or be stored in a storage unit, for example on a SIM card.

When the mobile radio set M is switched on again, the first acquisition means unit E1 determine the receiving level of all n frequencies stored in the first storage unit S1 and apply said frequencies to the evaluation unit A. The evaluation means unit A also receive, from the second storage unit S2, the receiving levels stored for all frequencies stored in the first storage unit S1. From the receiving levels received the evaluation unit A determine a value d which is a measure of the total deviation between the receiving levels stored and those measured upon switch on. The following formula can be used for this purpose:

$$d = \frac{1}{n} \cdot \sqrt{\sum_{i=0}^{n} (\text{Pegel\_alt}_i - \text{Pegel\_neu}_i)^2}$$

Therein, Pegel_alt$_i$ denotes the receiving level, stored before switch off, of the i$^{th}$ channel from among n channels, and Pegel_neu$_i$ denotes the receiving level, that is measured upon switch on for the i$^{th}$ channel from among n channels.

Comparison of the calculated value d with a fixed limit value yields a reliable decision as to whether the mobile radio set has been moved between switch off and switch on. Because of the large number of receiving levels compared, the deviation d represents quasi a fingerprint which represents a significant improvement in the evaluation of the receiving levels detected.

When the deviation d is below a fixed limit value, it may be assumed that the mobile radio set has not been moved and that the list with the channels is still valid as before. However, if the deviation d exceeds the fixed limit value, it may be assumed that the mobile radio set has been moved.

The exact value to be used as the limit value, that is, for the deviation that can still be tolerated, is specific of the implementation and must be separately defined for each cellular network.

Alternatively, however, the receiving levels can also be individually compared; in that case there is specified a given number of frequencies that may deviate from one another by a maximum percentage value so as to allow still the assumption that the set has remained in the same location.

If it is decided that no movement has taken place, the processing unit V. under appropriate control by the evaluation unit A, provides the control frequencies in the third storage unit S3 for the channel search for the forthcoming establishment of connections. Thus, using this significantly reduced list of channels synchronization is performed in the order of decreasing receiving levels, and also data is read and local information updated etc. until a usable channel is found. The processing unit V otherwise immediately provides, in the order of decreasing receiving levels, the list in the first storage unit S1 with the total number of frequencies assigned to the telecommunication network for the channel search so as to establish a connection. The list in the third storage unit S3 is in this case erased and formed again with updated control frequencies.

Overall, the mobile radio set according to the invention and the method according to the invention enhance the certainty that neither a time delay is introduced, because first the reduced list in the storage unit S3 is searched even though the mobile radio set was moved, nor that a long search is performed in all channels even though the mobile radio set was not moved.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed:

1. In a cellular network, a mobile radio set for the transmission of at least one of speech and data, said mobile radio set comprising:

a first storage unit operable to store a first set of channels associated with the cellular network;

a first acquisition unit operable, for each channel of the first set of channels, to determine a variable prior to a switching OFF of said mobile radio set and after a subsequent switching ON of said mobile radio set, each variable being dependent on a distance between said mobile radio set and a base station corresponding to a channel associated with the variable;

a second storage unit operable, for each channel of the first set of channels, to store each variable determined prior to the switching OFF of said mobile radio set; and an evaluation unit operable, for each channel of the first set of channels upon the subsequent switching ON of said mobile radio set, to determine a deviation between a first corresponding variable stored in the second storage unit prior to the switching OFF of said mobile radio set and a second corresponding variable determined by said first acquisition unit after the subsequent switching ON of said mobile radio set, said evaluation unit further operable to decide whether said mobile radio set moved between the switching OFF of said mobile radio set and the subsequent switching ON of said mobile radio set as a function of each deviation.

2. The mobile radio set of claim 1, wherein said evaluation unit is further operable to initiate a processing of the first set of channels for connection of said mobile radio set to a first base station associated with the first set of channels when it is determined by said evaluation unit that said mobile radio set moved between the switching OFF of said mobile radio set and the subsequent switching ON of said mobile radio set; and wherein said evaluation unit is further operable to initiate a processing of a second set of channels associated with the cellular network for connection of said mobile radio set to a second base station associated with a second set of channels when it is determined by said evaluation unit that said mobile radio set did not move between the switching OFF of said mobile radio set and the subsequent switching ON of said mobile radio set, the second set of channels being a subset of the first set of channels.

3. The mobile radio set of claim 2, further comprising:

a second acquisition unit operable to determine the second set of channels to include at least one base station co-located in a geographic location with said mobile radio set.

4. The mobile radio set of claim 2, further comprising:

a third storage unit operable to store a list of a second set of channels include at least one base station co-located in a geographic location with said mobile radio set.

5. The mobile radio set of claim 1, wherein said evaluation unit, as a function of a comparison of each deviation individually to a fixed value, is further operable to initiate one of a first processing of the first set of channels for connection of said mobile radio set to a first base station associated with the first set of channels or a second processing of a second set of channels associated with the cellular network for connection of said mobile radio set to a second base station associated with the second set of channels, the second set of channels being a subset of the first set of channels.

6. The mobile radio set of claim 1, wherein said evaluation unit, as a function of a comparison of each deviation collectively to a fixed value, is further operable to initiate one of a first processing of the first set of channels for connection of said mobile radio set to a first base station associated with the first set of channels or a second processing of a second set of channels associated with the cellular network for connection of said mobile radio set to a second base station associated with the second set of channels, the second set of channels being a subset of the first set of channels.

7. In a cellular network, a mobile radio set for the transmission of at least one of speech and data, said mobile radio set comprising:

a first storage unit for storing all channels allocated to the cellular network or all channels suitable for a connection of said mobile radio set to at least one base station associated with the cellular network;

a first acquisition unit for determining, for all channels stored in the first storage unit, a variable which is dependent on a distance between said mobile radio set and a base stations making a channel available to said mobile radio set prior to a switching OFF of said mobile radio set and after a subsequent switching ON of said mobile radio set;

a second storage unit for storing, for all of the channels stored in the first storage unit, each variable determined prior to the switching OFF of said mobile radio set; and an evaluation unit for determining a value characterizing a deviation between the variables stored in said second storage unit and the variables determined by said first acquisition unit after the subsequent switching ON of said mobile radio set, wherein said evaluation unit decides that a movement of said mobile radio set has taken place between the switching OFF of said mobile radio set and the subsequent switching ON of said mobile radio set as a function of at least one value characterizing deviations between the variables stored in the second storage unit prior to the switching OFF of said mobile radio set and the variables determined by said first acquisition unit after the subsequent switching ON of said mobile radio set.

8. The mobile radio set of claim 7, further comprising:

a second acquisition unit for determining channels suitable for a connection with a base station at the instantaneous location of said mobile radio set and a third storage unit for storing a list containing the channels suitable for a connection with a base station at the instantaneous location of said mobile radio set, wherein said evaluation unit utilizes all channels from the first storage unit for establishing a connection with said mobile radio set when one or more of the at least one value exceeds the fixed value, and wherein said evaluation unit utilizes all channels from the third storage unit for establishing a connection with said mobile radio set when one or more of the at least one value fails to exceed the fixed value.

9. The mobile radio set of claim 7, wherein each channel has a distinct frequency; and wherein the variables are a function of a receiving level of each frequency.

10. The mobile radio set of claim 7, wherein the at least one value characterizing the deviation between the variables stored in the second storage unit prior to the switching OFF of said mobile radio set and the variables determined by said first acquisition unit after the subsequent switching ON of said mobile radio set is a number of variables deviating from one another beyond a specified value.

11. The mobile radio set of claim 7, wherein the at least one value characterizing the deviation between the variables stored in the second storage unit prior to the switching OFF of said mobile radio set and the variables determined by said first acquisition unit after the subsequent switching ON of said mobile radio set is a characteristic value calculated from a totality of deviations.

12. The mobile radio set of claim 11, wherein the characteristic value is determined in accordance with the following formula:

$$d = \frac{1}{n} \cdot \sqrt{\sum_{i=0}^{n} (\text{Pegel\_alt}_i - \text{Pegel\_neu}_i)^2} \; ; \; \text{and}$$

wherein n is the number of channels stored in said first storage unit, $\text{Pegel\_alt}_i$ is an $i^{th}$ channel from among the n channels stored in said second storage unit prior to the switching OFF of said mobile radio set, and $\text{Pegel\_neu}_i$ is an $i^{th}$ channel from among then channels measured by said acquisition unit upon the subsequent switching on of said mobile radio set.

13. The mobile radio set of claim 12, wherein the i channels stored in the first storage unit are the channels of a specified frequency band with a specified bandwidth per channel.

14. In a cellular network, a method of operating mobile radio set for the transmission of at least one of speech and data, the method comprising:

for each channel of a first set of channels associated with the cellular network, determining a variable prior to a switching OFF of said mobile radio set and after a subsequent switching ON of said mobile radio set, each variable being dependent on a distance between said mobile radio set and a base station corresponding to a channel of the first set of channels corresponding to the variable; and for each channel of the first set of channels upon the subsequent switching ON of said mobile radio set, determining a deviation between a first corresponding variable stored in the second storage unit prior to the switching OFF of said mobile radio set and a second corresponding variable determined by said first acquisition unit after the subsequent switching ON of said mobile radio set; and deciding whether said mobile radio set moved between the switching OFF of said mobile radio set and the subsequent switching ON of said mobile radio set as a function of each deviation.

15. The method of claim 14, further comprising:

initiating a processing of the first set of channels for connection of said mobile radio set to a first base station associated with the first set of channels when it is decided that said mobile radio set moved between the switching OFF of said mobile radio set and the subsequent switching ON of said mobile radio set; and initiating a processing of a second set of channels associated with the cellular network for connection of said mobile radio set to a second base station associated with a second set of channels when it is determined by said evaluation unit that said mobile radio set did not move between the switching OFF of said mobile radio set and the subsequent switching ON of said mobile radio set, the second set of channels being a subset of the first set of channels.

16. The method of claim 14, further comprising:

as a function of a comparison of each deviation individually to a fixed value, initiating one of a first processing of the first set of channels for connection of said mobile radio set to a first base station associated with the first set of channels or a second processing of a second set of channels associated with the cellular network for connection of said mobile radio set to a second base station associated with the second set of channels, the second set of channels being a subset of the first set of channels.

17. The method of claim 14, further comprising:

as a function of a comparison of each deviation collectively to a fixed value, initiating one of a first processing of the first set of channels for connection of said mobile radio set to a first base station associated with the first set of channels or a second processing of a second set of channels associated with the cellular network for connection of said mobile radio set to a second base station associated with the second set of channels, the second set of channels being a subset of the first set of channels.

* * * * *